United States Patent
Robideaux et al.

(10) Patent No.: US 7,893,923 B2
(45) Date of Patent: Feb. 22, 2011

(54) WIRELESS CONTROL OF MULTIPLE COMPUTERS

(75) Inventors: Daniel Robideaux, San Jose, CA (US); Danny B. Rose, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 752 days.

(21) Appl. No.: 11/741,816

(22) Filed: Apr. 30, 2007

(65) Prior Publication Data

US 2008/0266247 A1 Oct. 30, 2008

(51) Int. Cl.
G09G 5/00 (2006.01)
(52) U.S. Cl. .................. 345/156; 345/1.1; 345/169
(58) Field of Classification Search ......... 345/156–184, 345/1.1–2.3
See application file for complete search history.

(56) References Cited

U.S. PATENT DOCUMENTS

| | | | |
|---|---|---|---|
| 6,806,866 B2 * | 10/2004 | Benayoun et al. ........... 345/163 |
| 7,228,108 B2 * | 6/2007 | Ayatsuka et al. ............... 455/73 |
| 7,595,723 B2 * | 9/2009 | Heitzmann et al. ...... 340/539.12 |
| 2002/0044131 A1 * | 4/2002 | Benayoun et al. ............ 345/156 |
| 2002/0052182 A1 * | 5/2002 | Mayuzumi .................... 455/41 |
| 2002/0138671 A1 * | 9/2002 | Struble ......................... 710/15 |
| 2004/0015625 A1 * | 1/2004 | Ayatsuka et al. ............... 710/62 |
| 2004/0233168 A1 * | 11/2004 | Christenson ................. 345/163 |
| 2005/0017949 A1 * | 1/2005 | Dunn et al. .................. 345/158 |
| 2007/0120643 A1 * | 5/2007 | Lee ........................... 340/5.61 |
| 2007/0132733 A1 * | 6/2007 | Ram ........................... 345/163 |
| 2007/0285394 A1 * | 12/2007 | Lee et al. ..................... 345/168 |
| 2008/0092165 A1 * | 4/2008 | Lee .............................. 725/40 |
| 2008/0096551 A1 * | 4/2008 | Huang ........................ 455/425 |
| 2009/0031403 A1 * | 1/2009 | Huang ............................ 726/4 |

* cited by examiner

Primary Examiner—Nitin Patel

(57) ABSTRACT

A system comprises a plurality of computers, a first wireless input device adapted to control any of the computers via wireless communication, and selection logic coupled to the first wireless input device. The selection logic enables a user to select one of the computers to be controlled by the first input device.

17 Claims, 1 Drawing Sheet

WIRELESS CONTROL OF MULTIPLE COMPUTERS

BACKGROUND

Many computer users have more than one computer. Many such users locate multiple such computers on a common work surface (e.g., a desk). Each computer has one or more input devices such as a keyboard and mouse. With multiple computers, each having a keyboard and mouse on the work surface, the work surface is thereby undesirably cluttered.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. The term "system" refers to a combination of two or more components. A system may comprise, for example, the combination of a server and a client communicatively coupled thereto, or a server alone, a client alone, or a subsystem within a computer.

DETAILED DESCRIPTION

Figure 1:
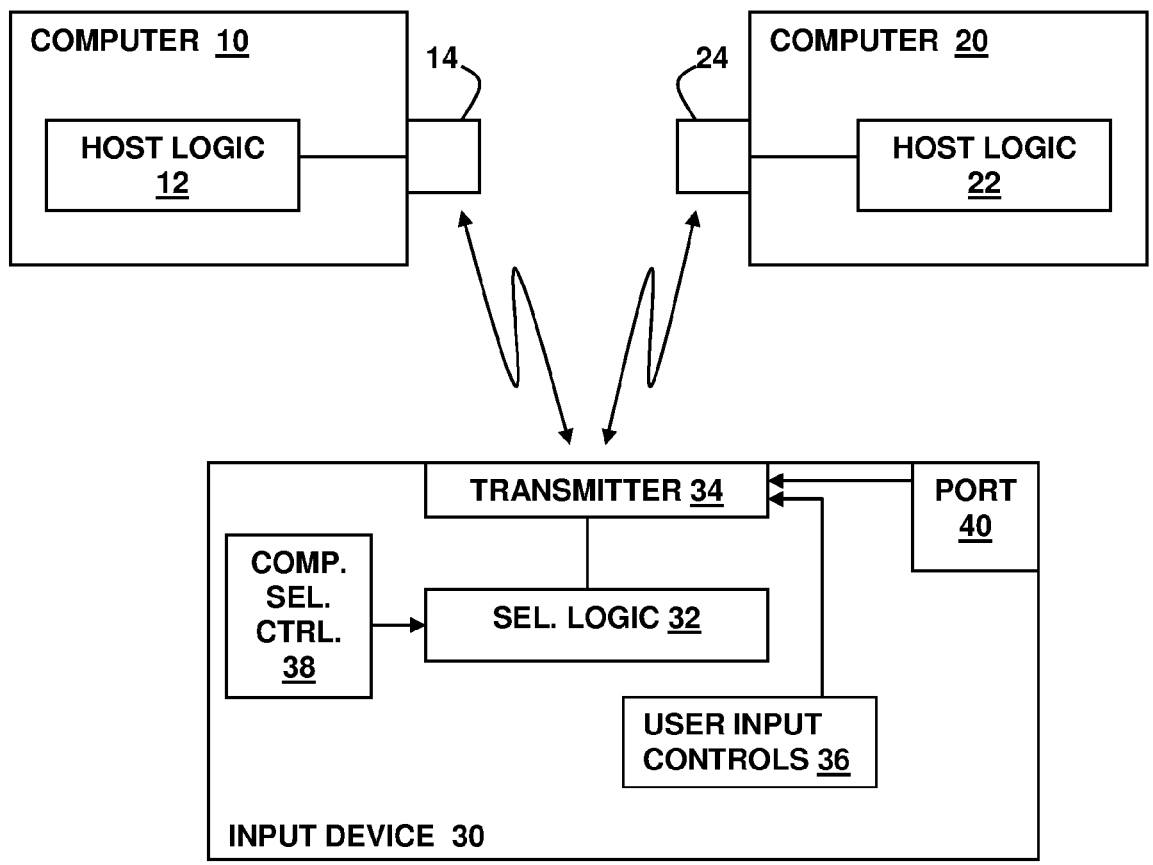
FIG. 1 shows a system comprising multiple computer and a wireless input device in accordance with various embodiments of the invention.
Figure 2:
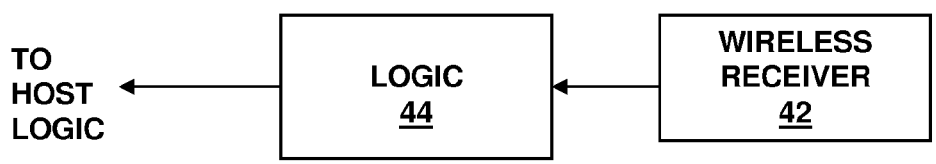
FIG. 2 shows a block diagram of a receiver usable with any of the computers of FIG. 1.

Referring to FIG. 1, a system is shown in accordance with various embodiments. As shown, the system comprises a plurality of computers 10 and 20 controlled by a common wireless input device 30. In some embodiments, the input device 30 comprises a wireless keyboard. In other embodiments, the input device 30 comprises another type of computer input device such as a mouse, trackball, etc. The input device 30 is wireless and thus comprises a wireless transmitter 34 which transmits wireless signals to wireless receivers 14 and 24 associated with computers 10 and 20, respectively. Each wireless receiver 14, 24 receives the wireless signal from the wireless encrypt device 30 and provides control signals indicative of the wireless input signals via a channel to host logic within each computer 10. Computer 10 comprises host logic 12 and computer 20 comprises host logic 22. The wireless signals from the input device 30 to receivers 14 and 24 thereby enable a user of the input device 30 to control the host logic and thus the associated computer. The host logic 12, 22 within computers 10, 20 comprises various components such as a processor, memory, etc.

In some embodiments, the input device 30 receives signals from a computer 10, 20. Such signals may cause various functions to be performed such as illuminating "caps lock" and "num lock" visual indicators.

The input device 30 comprises the transmitter 34, selection logic 32, user input controls 36, a computer selection control 38, and a port 40. In the embodiment in which the input device 30 comprises a keyboard, the user input controls 36 comprise a plurality of keys on the keyboard. Such keys comprise alphanumeric keys such as are typical of a "QWERTY"-style keyboard. The transmitter 34 receives signals from the user input controls 36 and transmits a wireless signal to the computer that the user has selected via control 38. The computer selection control 38 enables a user to select one of the computers 10, 20 to be controlled by the input device 30. Thus, in accordance with various embodiments, the wireless input device 30 is usable to control one computer at a time. The user selects which computer from among the multiple computers 10, 20, that the user desires to have the input device 30 control. The computer selection control 38 may be implemented as a button or a "hot key" on the keyboard. The output signal from the computer selection control 38 is provided to selection logic 32 which then causes the transmitter 34 to wirelessly transmit the signals from the input device 30 to the particular computer 10, 20 that has been selected by the user.

In accordance with various embodiments, any radio frequency (RF), infrared (IR) or other type of wireless communication technology can be implemented to enable the wireless input device 30 to communicate with and thus control computers 10, 20. For example, the wireless communication protocol used between the transmitter 34 and the receivers 14, 24 is in accordance with the Bluetooth protocol. In other embodiments, the wireless protocol is in accordance with any of the IEEE 802.11 protocols.

Each wireless receiver 14, 24 comprises an identifier that is unique to that receiver. For example, the identifier of receiver 14 is different from the identifier of receiver 24. In some embodiments, the identifier comprises a serial number associated with a receiver or the computer, a random number generated by the receiver or computer, or any other value that uniquely differentiates one receiver from another. The identifier is generated or pre-stored in the receiver 14, 24 or is generated by and provided to the receiver by the associated computer. For purposes of this disclosure, the identifier may referred to as the computer's identifier or the receiver's identifier.

Once the user has selected the desired computer to control (e.g., provide input signals to), the selection logic 22 causes the transmitter 34 to transmit wireless communication packets to the selected computer. The communication packets comprise the input control information from the user input controls 36. For example, if the user presses a particular key on a keyboard (assuming the input device 30 comprises a wireless keyboard), the communication packet transmitted by transmitter 34 comprises information indicative of the particular key that the user has pressed. The selection logic 32 causes the transmitter 34 also to include in the transmitted packet the unique identifier of the selected receiver/computer. Thus, while both computers 10, 20 are within wireless communication range of the wireless input device 30, the transmitted packet comprises the identifier of only the selected computer. The selected computer thus recognizes the transmitted packet as being a packet targeting that particular computer and that computer's receiver 14, 24 forwards the control information from the packet to the associated host logic 12, 22. The unselected computer (i.e., the computer whose identifier does not match the identifier in the transmitted packet) receives the transmitted packet, but upon not recognizing the identifier in the transmitted packet as being an identifier associated with the unselected computer, the unselected computer's receiver ignores the packet or causes the packet to be ignored.

In accordance with various embodiments, each wireless receiver 14, 24, comprises a portable and removable device that is removably mated to the associated computer. In some embodiments, the wireless receivers 14, 24 comply with the universal serial bus (USB) protocol. In such embodiments, each wireless receiver 14, 24 comprises a USB device that is mated to a USB port on the associated computer.

Some operating systems must receive a signal from a connected input device, such as a keyboard within an predetermined time period or otherwise the operating system will determine that the keyboard is no longer connected to the computer. Such an operating system will generate a "disconnect" event upon determining that the keyboard is no longer connected. Upon reconnecting the keyboard, the operating system will generate a "connect" event. Pop-up windows are displayed on displays associated with the computes 10, 20 upon the occurrence of connect and disconnect events. In accordance with embodiments of the invention, to preclude the operating system from generating disconnect and connect events each time the user selects a different computer for the input device 30 to control, a receiver 14, 24 of an unselected computer causes a communication channel to host logic 12, 22 in the associated computer 10, 20 to remain active. Maintaining the communication channel precludes the aforementioned connect and disconnect events from occurring.

In one embodiment, the receiver 14, 24 of an unselected computer 10, 20 generates "dummy" signals to the host computer to maintain that the communication channel active. The dummy signals may be repeated at a sufficient rate to maintain the channel active. The dummy signals comprise any suitable signal that will maintain the channel to the host logic 12, 22 active but does not actively cause the host logic 12, 22 to perform any action. In other embodiments, the wireless input device 30 transmits packets, not only to a selected computer (i.e., the computer selected to be controlled by the user), but also to one or more or all unselected computers (i.e., computers not selected to be controlled by the user). The packets transmitted to unselected computers comprise the identifier of the receiver 14, 24 of the associated unselected computer and the data payload of such packets comprises no data, or at least no data that would cause the receiving computer to perform any action other than maintain the respective communication channel active.

The computer that has been selected receives signals from the keyboard at a predetermined interval to maintain the communication channel in the computer associated with the keyboard in active state.

The input device 30 of FIG. 1 also comprises a port 40. In various embodiments, port 40 complies with the USB protocol, but can comply with other protocols as desired. Port 40 is used to permit a user to connect a second input device to input device 30. Such a second input device may comprise a pointing device such as a mouse or a track ball in accordance with various embodiments. The signals from such a second input device are provided through port 40 to transmit a 34. In such embodiments, therefore, transmitter 34 wirelessly transmits control signals from input device 30 and a second input device connected to input device 30 via port 40 to a selected computer 10, 20.

In various embodiments,

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
    a plurality of computers, each comprising a wireless transceiver;
    a first wireless input device adapted to control any of said computers via wireless communication with said computers; and
    selection logic coupled to said first wireless input device, said selection logic enables a user to select one of said computers to be controlled by said first wireless input device;
    wherein, while one of said computers is selected, said first wireless input device transmits a signal to an unselected computer, and the transceiver associated with said unselected computer responds to said signal by causing a communication channel to logic in the associated computer to remain active.

2. The system of claim 1 wherein each wireless transceiver is universal serial bus (USB)-compliant.

3. The system of claim 1 wherein each wireless transceiver causes a communication channel to logic in the associated computer to remain active when a different computer has been selected for control by the first wireless input device.

4. The system of claim 1 wherein said first wireless input device comprises an input device selected from a group consisting of a keyboard, mouse, and trackball.

5. The system of claim 1 further comprising a user control via which a user can select the computer to be controlled by the first wireless input device.

6. The system of claim 1 further comprising a second input device coupled to said first input device and wherein said selection logic causes said first wireless input device to transmit wireless signals to a selected one of said computers for control of the selected computer by both input devices.

7. The system of claim 1 wherein said selection logic is integrated into said first wireless input device.

8. The system of claim 1 wherein a wireless transceiver associated with each computer comprises an identifier, each identifier uniquely identifying the associated wireless transceiver, and said selection logic causes an identifier of the selected computer's wireless transceiver to be included in a wireless transmission to said selected computer.

9. An input device, comprising:
    a user input control;
    a wireless transmitter; and
    selection logic coupled to said user input control and said wireless transmitter, said selection logic enables a user of said input device to select one of a plurality of computers to be wirelessly controlled by said input device;
    wherein, while one of said computers is selected, said wireless transmitter transmits a signal to an unselected computer to cause the unselected computer to cause a communication channel associated with said input device and within said unselected computer to remain active.

10. The input device of claim 9 wherein said input device comprises an input device selected from a group consisting of a keyboard, mouse, and trackball.

11. The input device of claim 9 further comprising a computer selection control via which a user can select the computer to be controlled by the input device.

12. The input device of claim 9 further comprising a port to which a user control device can be mated, said wireless transmitter adapted to wirelessly transmit signals resulting from user activation said input device and said user control device to the selected computer.

13. The input device of claim 9 wherein said user control device comprises a cursor pointing device.

14. The input device of claim 9 wherein a wireless transceiver associated with each computer comprises an identifier, each identifier uniquely identifying the associated wireless transceiver, and said selection logic causes an identifier of the selected computer's wireless transceiver to be included in a wireless transmission to said selected computer.

15. An apparatus, comprising:
a wireless receiver; and
logic coupled to the wireless transceiver, said logic receives wireless input signals from a user input device and provides control signals indicative of said wireless input signals via a channel to a host logic to thereby enable a user to control the host logic via the user input device;
wherein said logic maintains the channel active upon repeated receipt of a dummy wireless input signal from the user input device, said dummy wireless input signal does not cause the logic to perform an action other than maintain the channel active.

16. The apparatus of claim 15 wherein said wireless receiver is transceiver is universal serial bus (USB)-compliant.

17. The apparatus of claim 15 wherein said apparatus is portable and removable from said host logic.

* * * * *